(No Model.)

F. H. BULLARD & F. HARRINGTON.
ELASTIC TIRE FOR VEHICLE WHEELS.

No. 478,564. Patented July 12, 1892.

Witnesses.

Inventors.
F. H. Bullard,
Frank Harrington

UNITED STATES PATENT OFFICE.

FREDERICK H. BULLARD AND FRANK HARRINGTON, OF CHICOPEE, MASSACHUSETTS.

ELASTIC TIRE FOR VEHICLE-WHEELS.

SPECIFICATION forming part of Letters Patent No. 478,564, dated July 12, 1892.

Application filed September 9, 1891. Serial No. 405,154. (No model.)

*To all whom it may concern:*

Be it known that we, FREDERICK H. BULLARD and FRANK HARRINGTON, citizens of the United States, residing at Chicopee, in the county of Hampden and State of Massachusetts, have invented new and useful Improvements in Elastic Tires for Vehicle-Wheels, of which the following is a specification.

This invention relates to improvements in elastic tires for vehicle-wheels, especially wheels for velocipedes, the object being to provide a spring or elastic tire which, while very light, has unusual capabilities for insuring easy resistance and practical avoidance of shocks and vibrations and also great durability.

The invention consists in the constructions and combinations of parts, all substantially as hereinafter more fully set forth, and pointed out in the claims.

Reference is to be had to the accompanying drawings, in which the invention is illustrated.

Figure 1:
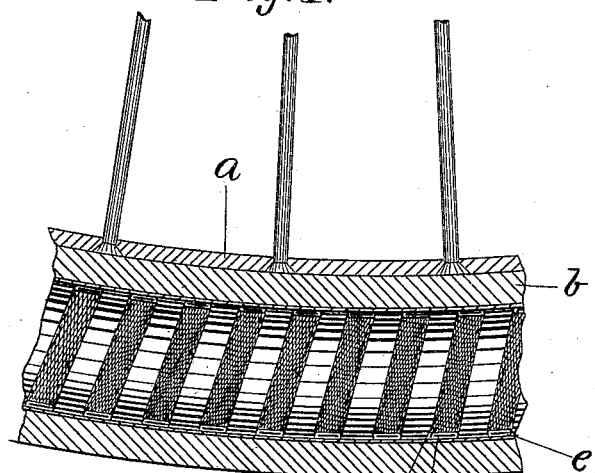
Figure 2:
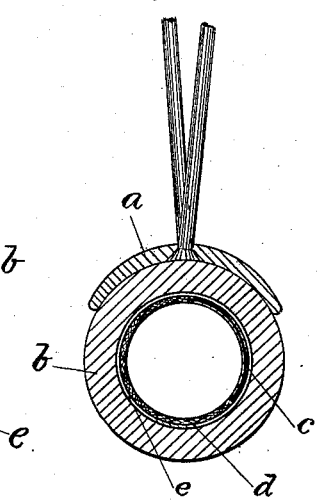
Figure 3:
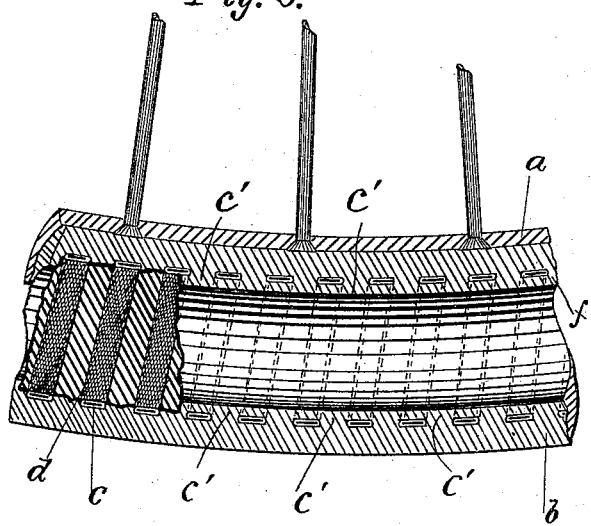
Figure 4:
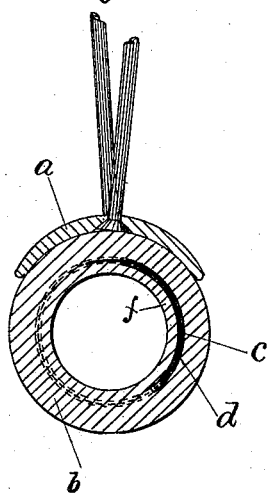

Figure 1 is a sectional view axially of a segment or portion of the tire and rim. Fig. 2 is a cross-section of the same. Fig. 3 is a view more or less similar to Fig. 1, but showing a slight modification in the arrangement of the parts; and Fig. 4 is a cross-section of the tire shown in Fig. 3.

In the drawings, $a$ represents the rim, and $b$ the tire. The tire is constructed in the form of a hollow annulus of india-rubber or gutta-percha in any of their elastic compounds, and there is provided within the hollow tire-ring one or more metallic spiral springs so applied as to reinforce the tire between the base thereof or part which is in bearing upon the rim and the tread, and, as shown in Figs. 1 and 2 at $c$, the said spring consists of a thin and flat band or strip of spring metal spirally wound, of a diameter corresponding substantially to the internal diameter of the tire-ring and with its convolutions open or widely separated, and the said spirally-wound metallic band is bent to form a ring, and the rubber annulus $b$ is molded about the same, or the said spring is incorporated within the rubber tire-ring in any suitable manner.

$d$ indicates the covering of textile material wound or otherwise applied directly upon the spring-strip metal from which the coil-formed ring is constituted, the same consisting of any suitable woven or braided fabric or material, and the spring-ring formed of the said wire or strip convolutions is further covered and inclosed within an annular casing or covering, (indicated at $e$ in the drawings.) Said covering $e$ for the coil-formed spring-ring may also be regarded as a lining for the inner wall of the hollow tire $b$. The said lining for the rubber ring is of substantially a firm and durable material—such as duck or canvas—and serves to bush the inner surface of the said ring, preventing the separated coils of the spring-ring from becoming embedded or sinking into the rubber, and the portions thereof which are next to or against and between the convolutions serve to distribute the stress imparted by the convolutions more generally throughout the circular length of the tire, while the winding about the individual convolutions prevent them from chafing or cutting the lining $e$.

The separation of the convolutions, substantially as shown, renders the reinforcing part of the tire comparatively light and with ample capabilities for resiliency, and said spring-ring having the widely-separated coils in conjunction with the covering or lining $e$, as and for the purpose set forth, renders the tire of unusual efficiency.

In Figs. 3 and 4 the convolutions of the strip material are shown as incorporated or embedded within the thickness of the rubber forming the annulus $b$, there being, nevertheless, sections of stock or material (indicated by $c'$) as constituted by the rubber itself under and between the convolutions, which act to truss or bridge the intervening portions of the tire-ring and which also act materially to prevent the undue sinking of the coils into the rubber at the time the stress is exerted thereon at or from the tread.

Having thus described our invention, what we claim, and desire to secure by Letters Patent, is—

1. In a tire for a vehicle-wheel, a hollow ring of elastic compressible material, substantially as set forth, and a spiral spring having the convolutions thereof separated and inclosed and extending around within the tire-ring and the said convolutions having a winding of suitable fabric, substantially as described.

2. In a tire for a vehicle-wheel, in combination, the ring of elastic india-rubber, the spring formed of separated convolutions of metal having the wrapping, and the annular inclosure composed of textile material for the coils which also constitutes lining for the tire-ring, substantially as described.

FREDERICK H. BULLARD.
FRANK HARRINGTON.

Witnesses:
W. S. BELLOWS,
T. F. DENEEN.